Nov. 15, 1955  A. E. ANDERSON  2,723,829
VALVE DEVICE FOR A MILKING MACHINE
Original Filed June 13, 1947
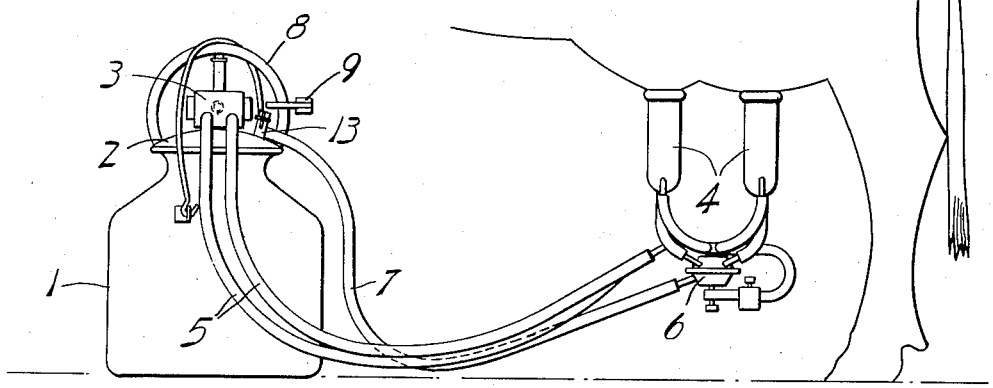
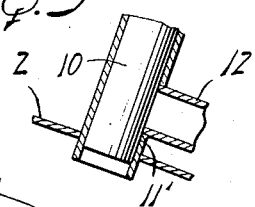
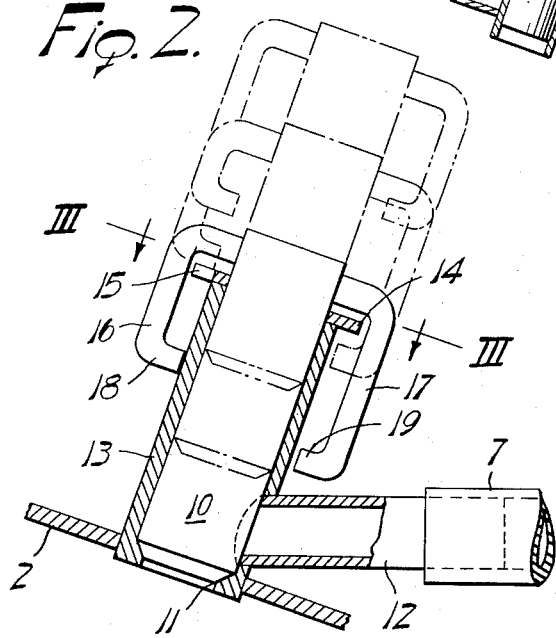
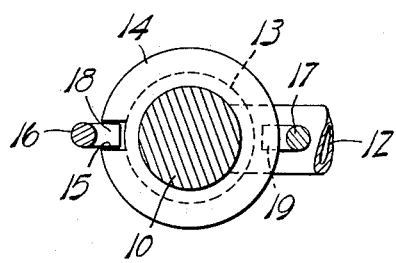
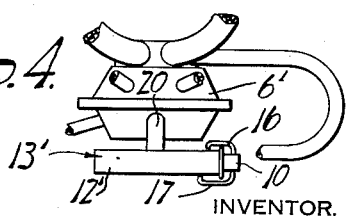
INVENTOR.
Austin E. Anderson
BY *Bean, Brooks, Buckley & Bean*
ATTORNEYS.

United States Patent Office 2,723,829
Patented Nov. 15, 1955

2,723,829

VALVE DEVICE FOR A MILKING MACHINE

Austin E. Anderson, Jamestown, N. Y.

Original application June 13, 1947, Serial No. 754,372, now Patent No. 2,518,589, dated August 15, 1950. Divided and this application April 29, 1950, Serial No. 159,116

5 Claims. (Cl. 251—100)

This invention relates to a milking apparatus such as is employed on dairy farms and more especially to the milk receiver for receiving the milk from the suction actuated milking unit.

An object of this invention is to provide a milk receiver or container having a vacuum shut-off valve of practical and simple construction which will insure maximum fluid flow capacity for the milking operation and, further, will automatically assume a fully closed position when removed from its full open position.

The invention further has for its object to provide a milk receiver with a shut-off valve which is effectively closed or sealed by fluid pressure differential when the milking is completed and one which will preclude the valve being left partially opened or incompletely closed.

Another object of this invention is to provide a most simple, practical and positive shut off valve for closing the entrance or passage of milk from the teat cups into the milk receptacle.

Valves used previously have generally been of the rotary type which the operator could turn part way, thereby restricting the size of the milk passage through the valve and unknowingly retard milking speed. The invention further consists of a larger milk passage for the milk as compared with rotary valves.

The invention further adapts itself to being cleaned more easily with straight-through brushing, the valve casing being of tubular design devoid of crevices or other inaccessible recesses.

The foregoing and other objects will manifest themselves as the following description progresses, in which reference is made to the accompanying drawings, wherein Fig. 1 is an elevation of the improved milk receiver in use;

Fig. 2 is an enlarged longitudinal sectional view through the receiver valve;

Fig. 3 is a detailed cross sectional view through the valve as taken about on line 3—3 of Fig. 2;

Fig. 4 is a fragmentary view of a modified construction; and

Fig. 5 is a sectional view showing a further embodiment.

Referring more particularly to the drawing, the numeral 1 designates the milk receiver, in the form of a suitable can or container, and having a removable cover 2 on which is carried the usual pulsator mechanism 3 for operatively applying the atmospheric and subatmospheric or other pressures to the teat cups 4 through hose connections 5. The subatmospheric pressure from a suitable source (not shown) is also applied to the inside of the receiver for draining the milk from the cups 4 through a claw 6 and a hose 7, the claw being more fully described in Letters Patent No. 2,518,589, issued to me on August 15, 1950 from which this is a division.

The cover 2 is also provided with a carrying handle 8 to which latter may be fixed a bracket 9 to support the entire milking unit including the teat cups when not in use.

Prior to removing the cups from the animal the low pressure maintained in the system is preserved in the receiver by closing a valve 10 of cylindrical, plug type onto its seat or seat stop 11 where it will be firmly held by the fluid pressure differential. As shown, this valve is interposed in the milk flow passage from the claw to the receiver. It may be mounted either on the cover 2, Fig. 2 or on the claw 6', Fig. 4. The hose 7 will be connected to a nipple 12 on the cylindrical valve housing 13, or to the nipple 12' on the claw carried valve housing 13'. For the purposes of this description, therefore, the milk receiver may be construed as ending either with the valve in Fig. 2, or with the valve in Fig. 4. The housing 13' communicates with the claw through a lateral passage 20. The valve 10 has a rather snug sliding fit in its housing so as to seal the passage practically against leakage. Consequently, the pressure differential will normally urge the valve inwardly and, when the valve is free, will quickly close the same and so hold it.

To support the valve in an open position, the housing 13 is provided with a lock flange 14 which has a peripheral notch 15, while the valve itself is formed with angularly displaced fingers 16 and 17 extending radially and overhanging the flange to different extents lengthwise of the housing. The free extremity of each finger is inturned to form a retaining lug 18, 19 which is designed to pass freely through the notch 15 when in registry therewith, but since the fingers are angularly displaced it is apparent that the valve must be rotated to effect successive registrations for passing both retaining lugs to enable complete withdrawal of the valve from its housing. Where the fingers are diametrically opposed the valve must be rotated 180° from one position to the other in disengaging both keeper lugs. The differential extent of the finger lugs 18 and 19 enables the lug 18 alone being moved through the notch 15 and, after turning the valve slightly, rested upon the upper side of the flange 14 for supporting the valve in its open position for receiving milk from the claw. This position is shown in the dot and dash lines in Fig. 2. When in such open position the underlying lug 19 will serve to retain the valve from total displacement, but should the valve be rotated sufficiently to register such lug 19 with the notch, the valve may be entirely removed, as shown by the double dot and dash lines.

The valve 10 is so designed as to be either fully closed or fully opened. The operator can always see the position of the valve and determine whether it is in one position or the other, and since it is pressure responsive the operator can be assured of the fact that when the valve is not in its fully opened position it will be firmly closed by the pressure differential. The operator of the machine cannot carelessly leave the valve in a partly opened position which would throttle or restrict the size of the passage 12 with a resultant impairment in the efficiency and performance of the milking machine. The valve stop 11, which constitutes the valve seat but which restricts the flow passage may be dispensed with since the sliding fit of the valve in its housing about and beneath the lateral port to passage 12 will be sufficient to provide a valving action when the valve moves downwardly beyond the inflow passage. Therefore, that portion of the housing about and beneath the inflow passage may be considered as the valve seat, in all of the embodiments, as depicted at 11' in Fig. 5, whether or not the seat extends out into the path of the valve. This will facilitate cleaning the valve by a simple throughbrush motion back and forth. The movement of the valve across the inflow passage 12 seals the same. The valve must be lifted sufficiently to engage one of the lugs 18, 19 on the upper side of the flange 14 in order to leave the valve in an open position. In such open position the passage 12 will be fully opened.

The valve is simple in design and yet is pressure responsive which fact insures the same being closed when both of the keeper lugs are below the flange 14 and there is residual negative pressure within the container. The parts are economical in production and efficient in operation.

While the foregoing description has been given in detail for clearness of understanding it is not intended thereby to limit the invention since the inventive principles involved are capable of assuming other physical embodiments without departing from the spirit of the invention and the scope of the appended claims.

What is claimed is:

1. A valve structure for use in a milking apparatus under vacuum, comprising a cylindrical valve housing formed with a bore of substantially uniform diameter open at its outer end and formed at its inner end with a valve seat in open communication with the vacuum of the apparatus, an encircling flange permanently fixed to the outer end of the housing and being formed with a notch in its radially projecting periphery, a cylindrical valve plug slidably mounted within and closely fitting the bore of the housing, the inner end of the plug being so formed as to engage the valve seat in fluid tight manner, a retaining lug attached to the outer end of the valve plug, the lug overhanging the flange of the housing and normally positioned behind the latter when the valve plug is in closed position and movable through the notch in the flange to an open position axially outward thereof, whereby upon relative rotation the flange will retain the valve plug in such open position against inward movement, and a second overhanging retainer lug axially spaced from the first retaining lug and in angular relation, whereby to compel the turning of the valve after passing the first lug through the notch of the flange before bringing the second lug into registry with the notch for passage therethrough in effecting comlete withdrawal of the valve from the housing.

2. A valve structure for use in a milking apparatus under vacuum, comprising a cylindrical valve housing formed with a bore of substantially uniform diameter open at its outer end and formed at its inner end with a valve seat constituting the valve outlet for open communication with the vacuum of the apparatus, an annularly encircling flange permanently fixed to the outer end of the housing and being formed with a segmentally relatively narrow through notch in its radially projecting periphery, a cylindrical valve plug slidably mounted within and closely fitting the bore of the housing, said plug being slidably withdrawable from said housing through said outer end, the inner end of the plug being so formed as to engage the valve seat in fluid tight manner, and a retaining lug attached to the outer end of the valve plug, the lug overhanging the flange of the housing and normally positioned behind the latter when the valve plug is in closed position and movable through the notch in the flange to an open position axially outward thereof when the lug and the notch are in a position of angular alignment, whereby upon relative rotation the flange will retain the valve plug in such open position against inward movement, and valve plug retainer means adapted to prevent complete withdrawal of the plug from the housing, said retainer means being releasable to permit such withdrawal only upon angular displacement of the lug from said position of angular alignment.

3. A valve structure for use in a milking apparatus under vacuum, comprising a housing element, and a valve plug element, the housing element being formed with a bore of substantially uniform diameter open at its outer end and formed at its inner end with a valve seat, two longitudinally spaced and angularly arranged retaining lugs carried by one of the elements, and a notch flange carried by the other element for cooperation with the retaining lugs, whereby the valve plug element may be completely withdrawn from the housing by successive axial movements of the same with an intervening rotary movement.

4. A valve structure for use in a milking apparatus under vacuum, comprising a housing element, and a valve plug element, the housing element being formed with a bore of substantially uniform diameter open at its outer end and formed at its inner end with a valve seat portion, said valve plug element conformably fitting the bore and slidable thereinto to close upon the seat portion, plural detent members longitudinally and angularly spaced on one of the elements, and annular retaining means carried by the other element for cooperation with the detent members to enable the valve plug element being completely withdrawn from the housing by successive axial movements of the same through an intervening rotary movement.

5. A valve structure for use in a milking apparatus under vacuum, comprising a cylindrical valve housing formed with a bore of substantially uniform diameter open at its outer end and formed at its inner end with a valve seat, an encircling flange permanently fixed to the outer end of the housing and being formed with a notch in its radially projecting periphery, a cylindrical valve plug slidably mounted within and closely fitting the bore of the housing, the inner end of the plug being so formed as to engage the valve seat in fluid tight manner, detent means carried by the valve plug and having two axially inwardly extending fingers angularly and longitudinally spaced relative to each other, a retaining lug carried by each finger and extending radially inwardly behind the flange, the lugs being successively passable through the notch of the flange upon relative rotation and axial movement to open the valve and to remove it from the cylinder.

References Cited in the file of this patent

UNITED STATES PATENTS

| | | |
|---|---|---|
| 4,419 | Clarke | Mar. 14, 1846 |
| 223,886 | Conklin | Jan. 27, 1880 |
| 540,481 | Boyer | June 4, 1895 |
| 942,482 | Burrell | Dec. 7, 1909 |
| 1,233,668 | Hinman | July 17, 1917 |
| 1,333,460 | Babson | Mar. 9, 1920 |
| 1,333,461 | Babson | Mar. 9, 1920 |
| 1,523,750 | Buellesbach | Jan. 20, 1925 |
| 1,548,512 | Costello | Aug. 4, 1925 |
| 2,084,698 | Mollet | June 27, 1937 |
| 2,506,722 | Kuehn | May 9, 1950 |
| 2,591,514 | Courtot | Apr. 1, 1952 |
| 2,621,677 | Curtis | Dec. 16, 1952 |
| 2,629,577 | Luterick | Feb. 24, 1953 |

FOREIGN PATENTS

| | | |
|---|---|---|
| 405,215 | Germany | Oct. 30, 1924 |
| 340,599 | Great Britain | Jan. 2, 1931 |
| 727,857 | France | Apr. 4, 1932 |